United States Patent [19]

Braehler et al.

[11] Patent Number: 4,817,903
[45] Date of Patent: Apr. 4, 1989

[54] ARRANGEMENT FOR CARRYING HORIZONTALLY AND VERTICALLY ADJUSTABLE DATA PROCESSING DEVICES

[75] Inventors: Manfred Braehler, Grossenlueder; Heinz Rousek; Erwin Noll, both of Huenfeld, all of Fed. Rep. of Germany

[73] Assignee: Wella Aktiengesellschaft, Darmstadt, Fed. Rep. of Germany

[21] Appl. No.: 117,068
[22] PCT Filed: Jan. 23, 1987
[86] PCT No.: PCT/EP87/00031
§ 371 Date: Sep. 29, 1987
§ 102(e) Date: Sep. 29, 1987
[87] PCT Pub. No.: WO87/04769
PCT Pub. Date: Aug. 13, 1987

[30] Foreign Application Priority Data

Jan. 29, 1986 [DE] Fed. Rep. of Germany ....... 3602549

[51] Int. Cl.⁴ ............................................ F16M 13/00
[52] U.S. Cl. .................................. 248/419; 108/105; 108/138; 248/1 C; 248/157; 248/287
[58] Field of Search ............... 248/419, 157, 125, 287, 248/295.1, 128, 420; 108/138, 141, 105; 269/76, 77, 78

[56] References Cited

U.S. PATENT DOCUMENTS

| | | | |
|---|---|---|---|
| 2,562,979 | 8/1951 | Yingling | 191/23 A |
| 2,703,265 | 3/1955 | Wolfe | 248/287 X |
| 4,515,086 | 5/1985 | Kwiecinski et al. | 108/105 X |
| 4,524,475 | 6/1985 | Valentino | 248/295.1 X |
| 4,561,619 | 12/1985 | Robillard et al. | 248/285 |
| 4,659,072 | 4/1987 | De La Rosa | 269/76 X |

FOREIGN PATENT DOCUMENTS

| | | |
|---|---|---|
| 3217431 | 11/1983 | Fed. Rep. of Germany . |
| 3415497 | 7/1985 | Fed. Rep. of Germany . |
| 2373103 | 12/1976 | France . |
| 0531992 | 8/1955 | Italy ................... 248/287 |
| 0464856 | 7/1935 | United Kingdom . |
| 2081362 | 7/1980 | United Kingdom . |

Primary Examiner—Ramon O. Ramirez
Attorney, Agent, or Firm—Michael J. Striker

[57] ABSTRACT

An arrangement for carrying horizontally and vertically adjustable data processing devices has two legs connected at the upper end with a horizontally arranged carrier for carrying and guiding a member which carries a data processing device by means of a column, wherein the legs have a fixed height and the member which carries a data processing device has a receptacle for the column which is vertically adjustable.

8 Claims, 3 Drawing Sheets

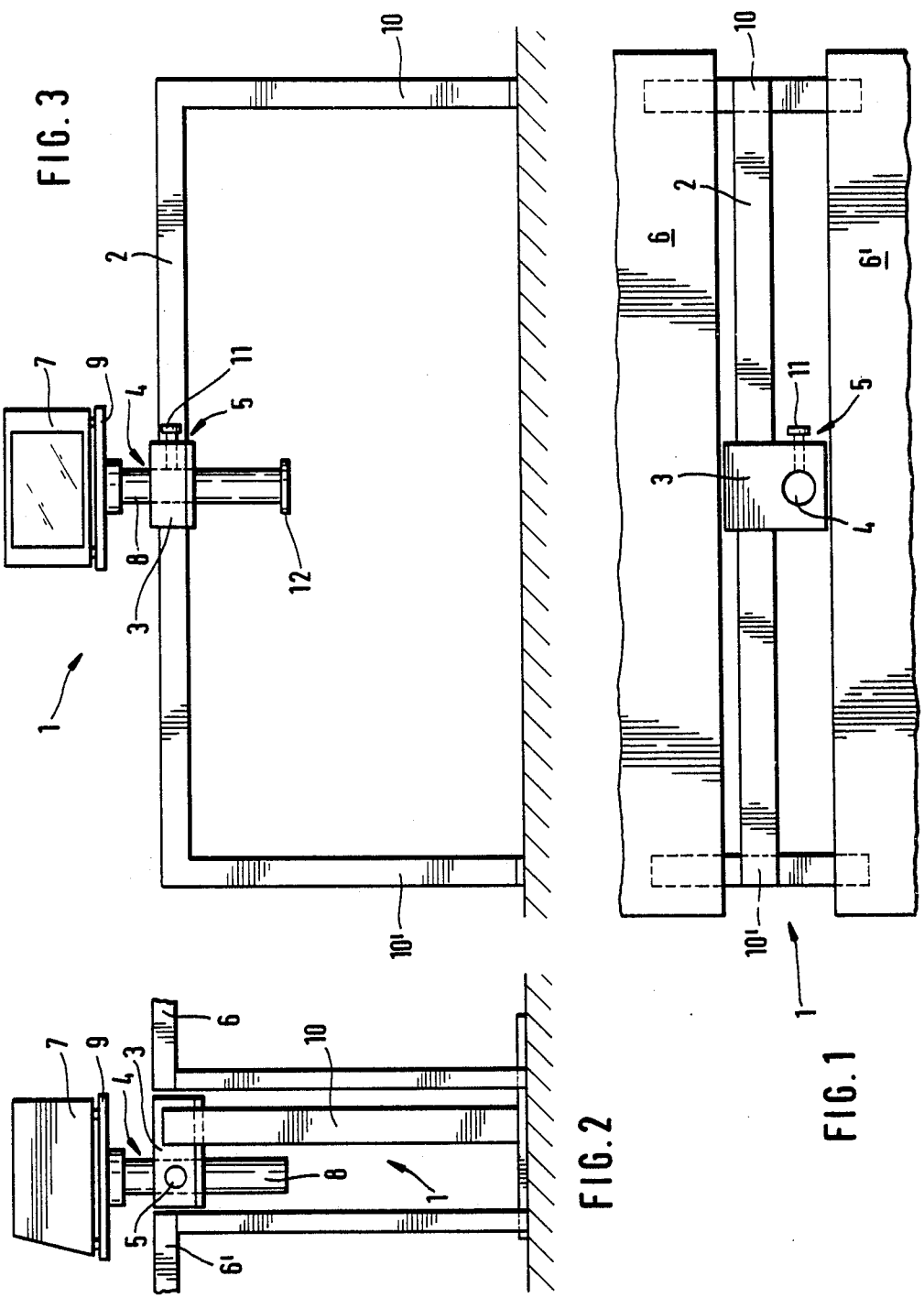

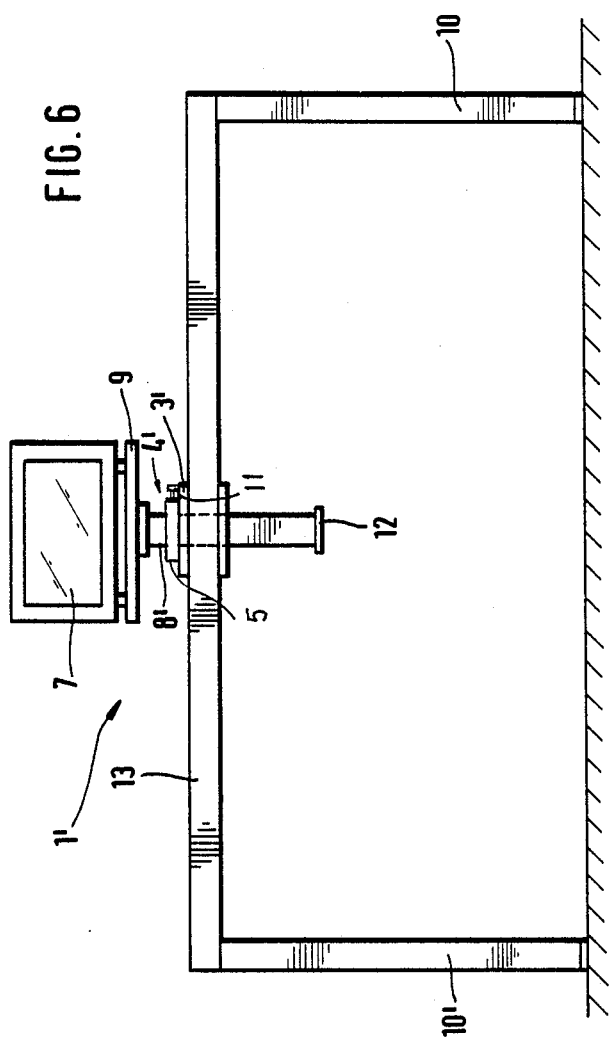
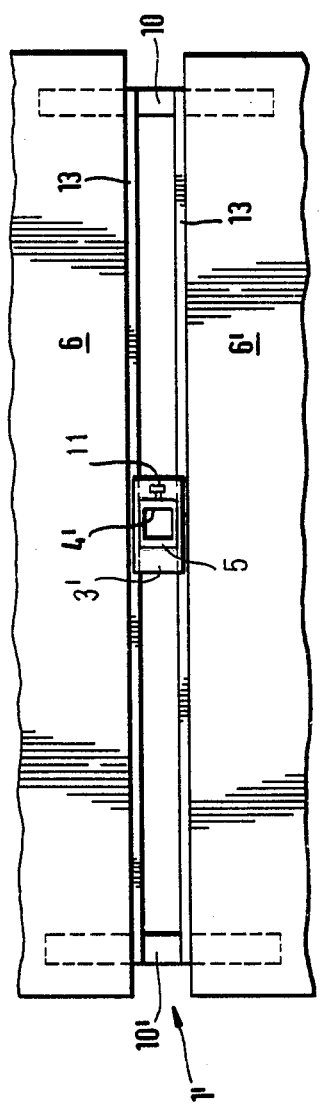
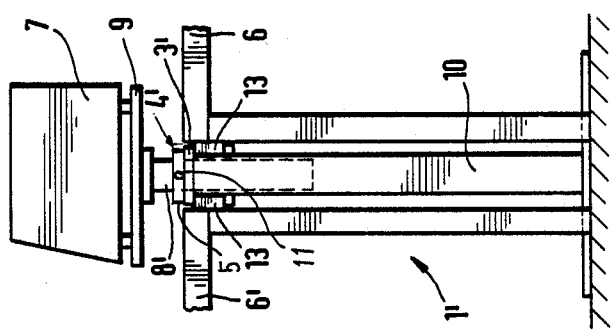

ARRANGEMENT FOR CARRYING HORIZONTALLY AND VERTICALLY ADJUSTABLE DATA PROCESSING DEVICES

BACKGROUND OF THE INVENTION

The invention is directed to an arrangement for carrying horizontally and vertically adjustable data processing devices, wherein the arrangement comprises two legs which are connected at the upper end with a horizontally arranged carrier for carrying and guiding a member, e.g. in the form of a slide or carriage, which member supports a data processing device by means of a column.

Such an arrangement is known from DE-A-No. 34 15 497. The vertical adjustment of the data processing device is effected by means of feet which are vertically adjustable. This requires an expensive crank drive with corresponding gear units for each adjustable foot.

SUMMARY OF THE INVENTION

It is the object of the invention to provide an arrangement for carrying horizontally and vertically adjustable data processing devices, which is simple in terms of construction and is accordingly inexpensive to produce. Another object of the invention to provide an arrangement, which is set up between two work tables located opposite one another, and makes it possible for the work tables to be located opposite one another so as to be relatively close, without the freedom of movement of the member being impaired by the table edges.

These objects are achieved in that the legs have a fixed height and in that the member comprises a receptacle for a vertically adjustable column.

In a first embodiment of the invention, the receptacle is arranged laterally adjacent to the carrier so that a vertically adjustable column, which is connected with the receptacle, makes it possible to adjust the height of the data processing device.

In an advantageous further embodiment of the invention, the receptacle is centrically arranged in the member and the carrier is constructed as a double carrier so that the arrangement, which is set up between two work tables located opposite one another, enables the distance between the oppositely located work tables to be relatively small without the freedom of movement of the member being impaired by means of the table edges.

In a construction of the double carrier, the carriers are provided with a rectangular section, which enables a relatively low constructional depth.

In another construction of the double carrier, the carriers have a round section, which brings about high resistance to twisting on all sides.

In a carriage construction of the member, the carrier comprises a guide rail for the carriage wheels on the upper and/or lower side. A slight horizontal sliding of the member is accordingly made possible, as well as a guiding of the carriage which is free of play.

An inexpensive production is made possible in that the carrier and the guide rail are constructed so as to form one piece.

A basic height for a data processing device when the column is not pulled out in an upward direction is predetermined by means of the fixedly predetermined height of the carriers, approximately at the height of the work tables, the basic height has the highest possible stability for the data processing device to be supported.

The invention is described in more detail in the following by means of drawings which are presented, in part, in a schematic manner.

BRIEF DESCRIPTION OF THE DRAWINGS

FIG. 1 shows the receptacle at the horizontally adjustable member in a top view of the arrangement, the receptacle being arranged laterally adjacent to the carrier;

FIG. 2 shows the arrangement supporting a data processing device in a side view;

FIG. 3 shows the arrangement with the horizontally adjustable member which carries a data processing apparatus by means of receiving it by means of a column;

FIG. 4 shows another embodiment arrangement with a double-carrier in a top view;

FIG. 5 shows the arrangement, according to FIG. 4, in a side view;

FIG. 6 shows the arrangement according to FIGS. 4 and 5 in another side view;

DESCRIPTION OF THE PREFERRED EMBODIMENT

Figure 7:
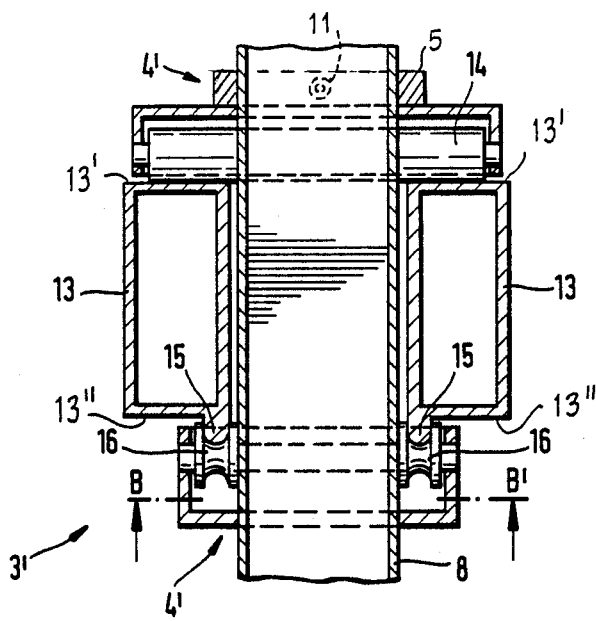
FIG. 7 shows a cross section A-A' (FIG. 8) through the member and the double carrier.
Figure 8:
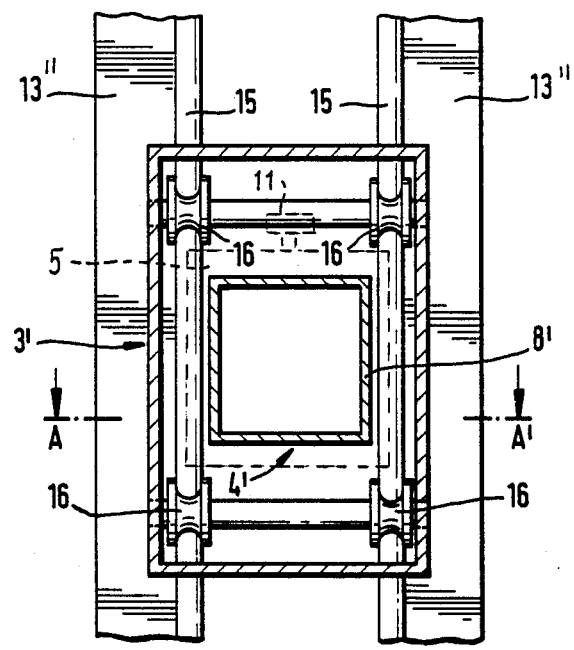
FIG. 8 shows a view of the sectioned member (B-B'—FIG. 7), from below.

FIG. 1 shows a top view of the arrangement 1 which comprises a horizontally arranged carrier 2 and is provided with a horizontally adjustable member 3. The member 3 comprises a receptacle 4 which is arranged laterally adjacent to the carrier 2 and is provided with a locking device 5. The arrangement 1 is arranged between two work tables 6, 6', which are located opposite one another, so that the arrangement 1 is available for alternating use.

FIG. 2 shows the arrangement 1 with a member 3 which is connected with a cylindrical column 8 by means of the receptacle 4 and carries the data processing device 7 by means of a rotatable carrying plate 9. The height of the column 8, and accordingly the height of the data processing device 7, can be adjusted by means of the locking device 5. Of course, the column 8 and the locking device 5 can also be constructed in such a way that the column 8 is freely rotatable around its axis, wherein the carrying plate 9 can then be securely connected with the column 8. Of course, a rectangular cross section can be provided for the column 8 and the receptacle 4, wherein the carrying plate 9 must then be rotatably connected with the column 8. The height of the arrangement 1 is predetermined by means of the fixed height of the legs 10, 10'. The height of the carrier 2 is dimensioned in such a way that the carrying plate 9 is positioned closely above the work tables 6, 6' in its lowest vertical position, and a basic height adjustment of the carrying plate 9 is accordingly predetermined. An additional vertical height adjustment can be effected individually by means of the vertically adjustable column 8 by means of the locking device 5. A high carrying stability of the data processing device 7 is ensured by means of the receptacle 4 which is arranged laterally adjacent to the carrier 2.

FIG. 3 shows the arrangement 1 without tables 6, 6' for the sake of clarity. In this embodiment example, the locking device 5 is provided with a clamping screw which secures the column 8 in the adjusted position. The member 3, which is horizontally adjustable on the carrier 2, can be constructed as a slide or carriage, also, if desired, in such a way as to be fastenable with the carrier. The column 8 can be provided with a screw 12 at its lower end so as to prevent a complete unscrewing.

In another embodiment example, FIGS. 4 to 6 show an arrangement 1' with a double carrier 13, wherein the member 3' has a centrically arranged receptacle 4'. This embodiment example has the advantage that the work tables 6, 6' can be placed against the double carrier 13 and the freedom of movement of the member 3' is not restricted. Another advantage consists in that the member 3' receives the load centrically relative to the double carrier 13 by means of the centrically arranged receptacle 4. Another advantage is that the work tables 6, 6' can be placed relatively close together by means of this arrangement of the double carrier 13. The member 3' can be constructed as a slide or carriage construction, as desired.

FIG. 7 shows the member 3' in an axial cross section through the column 8'. The column 8' shown here has a rectangular cross section, so that an axial rotation of the column 8' in the member 3' is not possible, rather, the carrying plate 9 must be constructed so as to be rotatable. The two upper sides 13' of the double carrier 13 serve as counter-bearings or roll guides for the wheel 14. A guide rail 15 is provided at the lower side 13" of the double carrier 13 and prevents a lateral displacement of the member 3' in a transverse direction relative to the guide direction of the double carrier 13. A wheel 16, which sits on the guide rail 15, comprises a section which complements the section of the guide rail 15. Instead of the wheel 14, which is constructed as an elongated cylinder, a corresponding guide rail 15 with a wheel 16 which corresponds to it can also be provided so that the roll resistance during the movement of the member 3' is substantially reduced.

It will be understood that each of the elements described above, or two or more together, may also find a useful application in other types of constructions differing from the types described above.

While the invention has been illustrated and described as embodied in an arrangement for carrying horizontally and vertically adjustable data processing devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for carrying adjustable data processing devices, comprising two vertical legs having upper ends; a horizontally arranged carrier connecting said upper ends of said vertical legs; a member movable relative to said carrier; a column arranged to support a data processing device; said legs having a fixed height; said member being provided with a receptacle for receiving said column; said carrier being formed as a double carrier including two carrier members; and said receptacle being arranged centrically relative to said double carrier.

2. An arrangement as defined in claim 1, wherein each of said carrier members of said double carrier has a rectangular cross-section.

3. An arrangement as defined in claim 1, wherein each of said carrier members of said double carrier has a round cross-section.

4. An arrangement as defined in claim 1; and further comprising a work table associated with said legs and having a predetermined height, said member having an upper side arranged substantially at the height of said work table.

5. An arrangement as defined in claim 1; and further comprising a work table associated with said legs and having a predetermined height, said member having an upper side arranged substantially at the height of said work table.

6. An arrangement for carrying adjustable data processing devices, comprising two vertical legs having upper ends; a horizontally arranged carrier connecting said upper ends of said vertical legs; a member movable relative to said carrier; a column arranged to support a data processing device; said legs having a fixed height; said member being provided with a receptacle for receiving said column; said carrier having an upper side and being provided at said upper side with a guide rail for supporting said member.

7. An arrangement for carrying adjustable data processing devices, comprising two vertical legs having upper ends; a horizontally arranged carrier connecting said upper ends of said vertical legs; a member movable relative to said carrier; a column arranged to support a data processing device; said legs having a fixed height; said member being provided with a receptacle for receiving said column; said carrier having a lower side and being provided at said lower side with a guide rail for supporting said member.

8. An arrangement for carrying adjustable data processing devices, comprising two vertical legs having upper ends; a horizontally arranged carrier connecting said upper ends of said vertical legs; a member movable relative to said carrier; a column arranged to support a data processing device; said legs having a fixed height; said member being provided with a receptacle for receiving said column; said carrier having an upper side and a lower side and being provided on each of said sides with a guide rail for supporting said member.

* * * * *